Sept. 20, 1971    J. A. CARLANI, JR    3,605,766
PROTECTIVE HEAD GEAR HAVING SELF-CLEANING FEATURE
Filed March 17, 1969
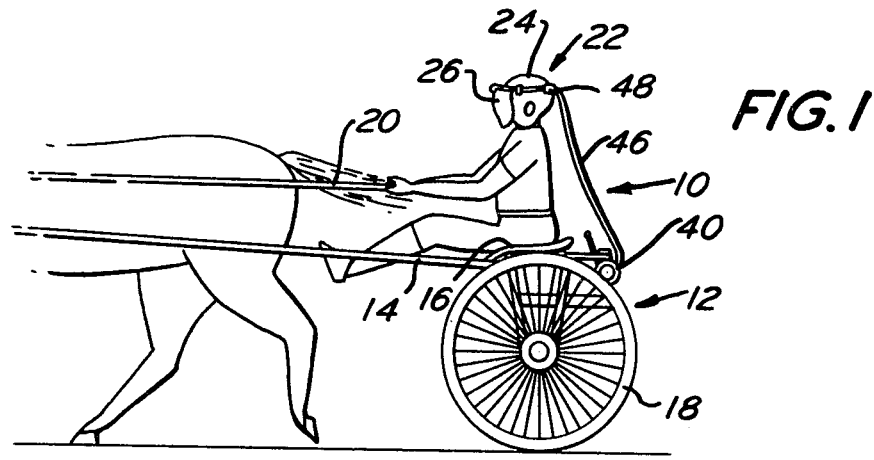
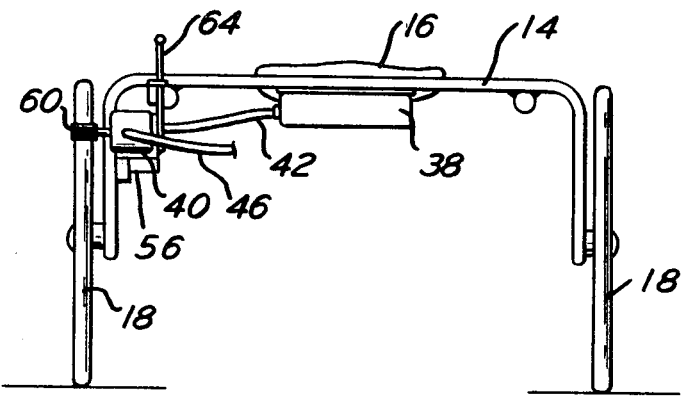
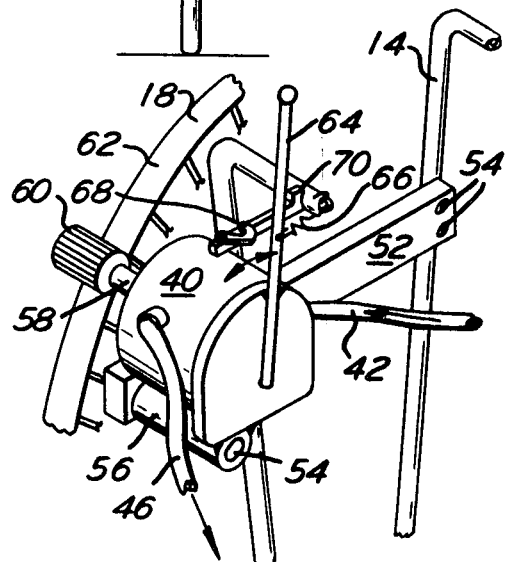
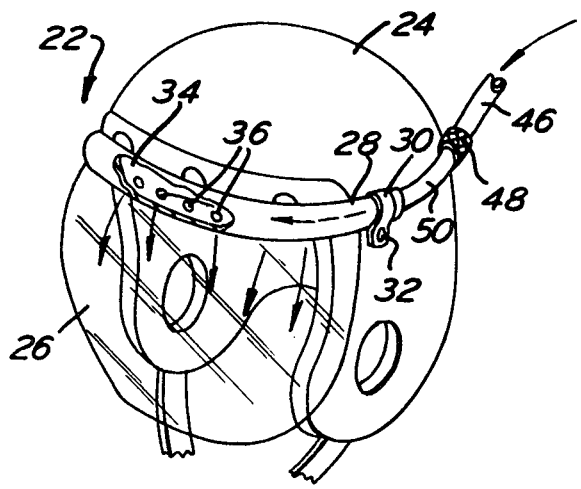
INVENTOR
JOSEPH A. CARLANI, JR.
BY
Seidel, Gonda & Goldhammer
ATTORNEYS.

United States Patent Office 3,605,766
Patented Sept. 20, 1971

3,605,766
PROTECTIVE HEAD GEAR HAVING SELF-CLEANING FEATURE
Joseph A. Carlani, Jr., 47 E. 5th and Pope Sts., Burlington, N.J. 08016
Filed Mar. 17, 1969, Ser. No. 807,694
Int. Cl. A61f *9/02;* B08b *3/02*
U.S. Cl. 134—47   4 Claims

ABSTRACT OF THE DISCLOSURE

Protective head gear is disclosed, comprising a head receiving member and a face shield, and fluid distribution means associated with the face shield for applying a cleaning fluid to the shield. In one form of the invention, a fluid reservoir is provided on a wheeled vehicle, and a wheel-driven pump provided to convey cleaning fluid from the reservoir to the distribution means.

---

This invention relates to protective head gear, and more particularly, to protective head gear having a self-cleaning feature.

Protective head gear of the type commonly known as a "crash helmet" is in widespread use. Operators of vehicles wherein collision or upset is likely, such as racing cars, sulkies, motorcycles, scooters and the like have found such head gear to be an important safety adjunct. Indeed, motor vehicle laws in some states require that the operators of particular classes of vehicles be equipped with protective head gear.

It is not unusual to provide protective head gear of the type mentioned above with a face shield or visor, to protect the face, and particularly the eyes, of the operator. Although such face shields are initially quite effective for their intended purpose, they are likely to gradually accumulate a film of dust, road grime or other dirt. Such film gradually obscures the operator's vision, and thereby leads to a dangerous condition. Frequently, the ordinary task of controlling the vehicle requires the use of both of the operator's hands, thereby rendering it impractical for him to manually clean the face shield during vehicle operation.

It is an object of this invention to provide protective head gear having self-cleaning features, whereby a face shield may be selectively cleaned with but momentary release of the vehicle controls by the operator. The foregoing object is accomplished, in one form of the invention, by providing a fluid distribution means in association with the face shield and a source of fluid. At the option of the operator, fluid may be applied by the distributor to the face shield, thereby washing away the obscuring film, and leaving the operator's vision unobstructed.

It is another object of this invention to provide apparatus wherein a vehicle-mounted pump, driven by a wheel of the vehicle, provides fluid pressure for applying a cleaning fluid to a face shield. In the presently preferred embodiment, direct friction drive between the wheel and a drive member for the pump is selectively provided. Ordinarily, the drive means and wheel are disengaged. When it becomes necessary to clean the face shield, however, the operator can quickly bring the drive means into engagement with the wheel to provide fluid to the distribution means. A reservoir of cleaning fluid may be provided on the vehicle.

In view of the foregoing, it is another object of this invention to provide an apparatus wherein vehicle-mounted components provide cleaning fluid to treat the face shield of a protective head gear.

Other objects will appear hereinafter.

The foregoing and other objects are accomplished, in one form of the invention, by apparatus comprising a fluid distribution means associated with the face shield of a protective head gear, and a fluid pressure means in fluid communication with the reservoir and the distribution means. The fluid pressure means may take the form of a pump, selectively coupled to the wheel of a vehicle.

For the purpose of illustrating the invention, there is shown in the drawings a form which is presently preferred; it being understood, however, that this invention is not limited to the precise arrangements and instrumentalities shown.

FIG. 1 is a side elevation view of a vehicle incorporating apparatus in accordance with the present invention.

FIG. 2 is an end elevation view of the vehicle in FIG. 1.

FIG. 3 is a detail view showing a portion of the apparatus in FIGS. 1 and 2.

FIG. 4 is a perspective view of a protective head gear incorporating the invention, partly broken away.

Referring now to the drawings in detail, wherein like numerals indicate like elements, there is seen in FIG. 1 an apparatus designated generally by the reference numeral 10, associated with a horse drawn sulky, designated generally by the reference numeral 12. The sulky 12, representative of vehicles with which the apparatus 10 may be used, comprises a frame 14, to which an operator's seat 16 is affixed, and a pair of wheels 18.

In FIG. 1, a driver is depicted seated in the seat 16, grasping reins 20. The driver wears protective head gear, designated generally by the reference numeral 22, such head gear comprising a head receiving helmet portion 24 having a face shield 26 affixed thereto.

Fluid distribution means, including a manifold 28, are associated with the face shield 26. In the illustrated embodiment, the manifold 28 is secured to the helmet portion 24 by straps 30 and a rivet 32. Any other suitable means could of course be used to affix the manifold 28 to the head gear 22.

The manifold 28 includes an internal passage 34, defining a conduit for the cleaning fluid. Also, the manifold 28 includes spaced openings 36, in communication with the passage 34, for directing fluid onto the face shield 26.

Referring now to FIG. 2, an arrangement whereby cleaning fluid may be conveyed to the head gear 22 is illustrated.

A fluid reservoir 38 is affixed to the underside of the frame 14. Also affixed to the frame 14 is a pump 40. A hose or conduit 42, coupled to the inlet side of the pump 40, places the pump 40 in fluid communication with the reservoir 38. Also, a hose or conduit 46, coupled to the outlet side of the pump 40, places the pump 40 in fluid communication with the manifold 28. In the illustrated, preferred form of the invention, a readily separable coupling 48, itself of conventional construction, interconnects the hose 46 with a lead-in 50 for the manifold 28. Thus, in the illustrated embodiment, the head gear 22 is readily selectively connected and disconnected from the hose 46, and consequently, from the rest of the apparatus 10.

Referring now to FIG. 3, there is seen an exemplary means whereby the pump 40 is coupled to the frame 14, and adapted to be selectively driven by one of the wheels 18.

A support member 52 is secured to the frame 14, as for example, by bolts 54. A pivot pin 54 is rigidly secured in cantilever fashion to the support member 52. A cylindrical boss 56, rigidly coupled to the casing of the pump 40, pivotably engages the pivot pin 54. Thus, the pump 40 may be rotated as a unit about an axis defined by the pivot pin 54. A shaft 58, having a splined friction wheel 60 at its distal end, projects from the casing of the pump 40, and is coupled to the pump rotor, not shown, in the drawings. As is apparent from FIG. 3, when the pump 40 is rotated in a clockwise direction, the friction wheel 60 comes into engagement with the outer periphery of the tire 62 associated with the wheel 18.

An operating lever 64 is associated with the pump 40. For example, in the illustrated embodiment, the operating lever 64 is welded to the casing of the pump 40. In the illustrated embodiment, opposite ends of a tension spring 66 are anchored to the operating lever 64 and a portion of the frame 14. Thus, the spring 66 biases the pump 40 for rotation in a clockwise direction about the pivot pin 54, and biases the friction wheel 60 into engagement with the periphery of the tire 62.

A releasable latch 68, pivoted to a support 70 affixed to a portion of the frame 14, provides a convenient means for selectively maintaining the friction wheel 60 out of engagement with the tire 62. Thus, when it is desired that the friction wheel 60 be out of engagement with the tire 62, the latch 68 need only be hooked about the operating lever 64 to prevent movement of the lever 64 and pump 40 in the direction of movement urged by the spring 66.

The operation of the apparatus 10 will now be described.

Referring to FIG. 1, when an operator seats himself on the sulky 12, he initially connects the head gear 22 with the rest of the apparatus 10. Thus, the hose 46 from the pump 40 is coupled to the lead-in 50 to the manifold 28.

The operator may drive the sulky in the usual manner. If the face shield 26 becomes obscured, the operator releases the latch 68, thereby causing the spring 66 to bias the friction wheel 60 into engagement with the tire 62. Such engagement causes the pump 40 to withdraw fluid from the reservoir 38, and to convey such fluid under pressure to the manifold 28. The fluid exits the manifold 28 through the openings 36, and is thereby distributed over the face shield 26. When the operator is satisfied with the condition of the face shield 26, he can move the operating lever 64 to remove the friction wheel 60 from contact with the tire 62. Referring to FIG. 3, movement of the operating lever 64 in a counter-clockwise direction, toward the left of the figure, causes disengagement.

The latch 68 may be self-engaging, so that it automatically catches the operating lever 64 when the lever is moved to the retracted position. With such an arrangement, the apparatus 10 may be operated with a minimum of manipulation by the operator. Referring again to FIG. 1, the operating lever 64 is preferably located within easy reach of the operator. No more than a momentary release of the reins 20 is necessary to effect operation of the apparatus 10.

A wide variety of well-known fluids may be used in conjunction with the apparatus 10. For example, conventional commercially available automotive windshield cleaners may be used. Those skilled in the art will appreciate that other fluids, such as water or the like, may be used.

The present invention may be embodied in other specific forms without departing from the spirit or essential attributes thereof.

I claim:

1. For use with protective head gear comprising a head receiving member and a transparent face shield coupled to said head receiving member, cleaning apparatus for said face shield comprising fluid distribution means associated with the face shield for applying a cleaning fluid to said face shield, said fluid distribution means including conduit means for receiving cleaning fluid from a source thereof, a fluid reservoir, and fluid pressure means in fluid communication with said reservoir and said conduit means adapted to convey cleaning fluid to said conduit means, said fluid pressure means comprising a pump, a vehicle including wheels and a frame supported by said wheels, said pump being coupled to and supported by said frame, drive means for said pump adapted to be drivingly coupled to a wheel of said vehicle, and means for selectively coupling said drive means to said wheel to pump fluid from said reservoir to said conduit means.

2. Apparatus in accordance with claim 1 wherein said fluid distribution means comprises a horizontally extending manifold disposed adjacent an upper edge of said face shield, said manifold having a plurality of openings therein for directing fluid onto said face shield.

3. For use with protective head gear comprising a head receiving member and a transparent face shield coupled to said head receiving member, cleaning apparatus for said face shield comprising fluid distribution means associated with the face shield for applying a cleaning fluid to said face shield, said fluid distribution means including conduit means for receiving cleaning fluid from a source thereof, a fluid reservoir, and fluid pressure means in fluid communication with said reservoir and said conduit means adapted to convey cleaning fluid to said conduit means, said fluid pressure means comprising a pump associated with a wheel-supported vehicle, drive means for said pump adapted to be drivingly coupled to a wheel of the vehicle, and means for selectively coupling the drive means to the wheel to pump fluid from said reservoir to said conduit means.

4. Apparatus in accordance with claim 3 wherein said fluid distribution means comprises a horizontally extending manifold disposed adjacent an upper edge of said face shield, said manifold having a plurality of openings therein for directing fluid onto said face shield.

References Cited

UNITED STATES PATENTS

| 2,752,925 | 7/1956 | Friers | 134—123 |
| 3,263,236 | 8/1966 | Humphrey | 2—9 |
| 3,455,624 | 7/1969 | Godfrey | 350—63 |
| 2,971,196 | 2/1961 | Howell | 2—14 |

FOREIGN PATENTS

| 1,098,537 | 3/1955 | France | 2—9 |
| 1,108,504 | 8/1955 | France | 2—9 |

DONALD A. GRIFFIN, Primary Examiner

U.S. Cl. X.R.

2—14